Oct. 15, 1963    J. B. KENNEDY    3,107,312
HELIX ASSEMBLY FOR TRAVELING WAVE TUBES
Filed Sept. 7, 1960    2 Sheets-Sheet 1

INVENTOR
JOSEPH B. KENNEDY
BY
ATTORNEY

Oct. 15, 1963 J. B. KENNEDY 3,107,312
HELIX ASSEMBLY FOR TRAVELING WAVE TUBES
Filed Sept. 7, 1960 2 Sheets-Sheet 2
FIG.4.
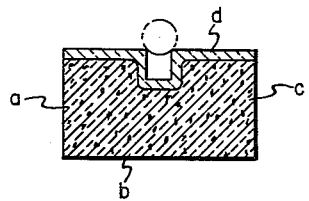
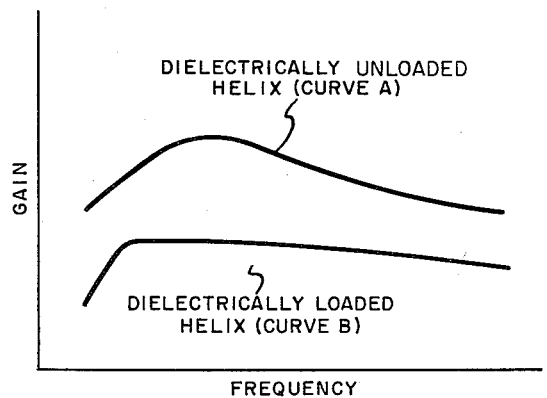
FIG.5.
FIG.6.
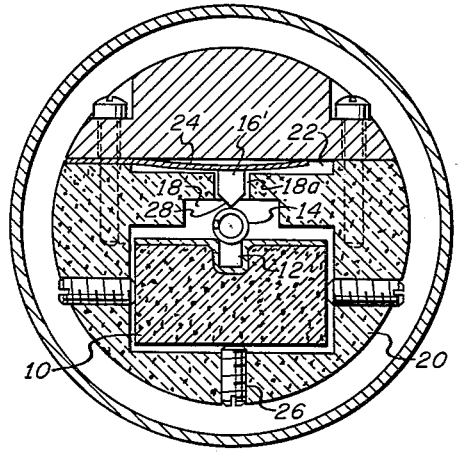
FIG.7.
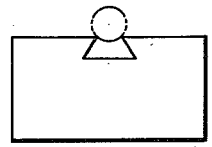
FIG.8.
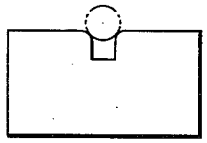
INVENTOR.
JOSEPH B. KENNEDY
BY
Henry Huff
ATTORNEY United States Patent Office 3,107,312
Patented Oct. 15, 1963

3,107,312
HELIX ASSEMBLY FOR TRAVELING WAVE TUBES
Joseph B. Kennedy, Hicksville, N.Y., assignor to Sperry Rand Corporation, Great Neck, N.Y., a corporation of Delaware
Filed Sept. 7, 1960, Ser. No. 54,518
7 Claims. (Cl. 315—3.5)

This invention relates generally to traveling wave tubes and more particularly to apparatus for supporting a helix-type slow wave structure.

Usually, the helix of a traveling wave tube is rigidly held in place within the tube between and by several ceramic rods circumferentially positioned about the outside of the helix. Preferably three rods are employed, each of which has a diameter substantially the same as the diameter of the helix itself so that the helix will be adequately supported, yet will not be dielectrically loaded by large quantities of dielectric material in the vicinity of the helix. Tubes which operate in the very high frequency regions of the spectrum utilize extremely small diameter helices, e.g. a V band tube utilizes a helix having an outer diameter in the order of .020 inch, and therefore require ceramic support rods which have extremely small diameters. Fabrication of small diameter ceramic rods is difficult, and the brittleness of such rods makes them inadequate as supporting elements. In addition, even if strong, small diameter rods were available, they would not rigidly hold the helix in place within the tube because they would tend to bend readily and pull away from the relix being supported. Therefore, straps or the like would have to be employed to pull the rods against the helix.

The present invention provides a strong helix support which rigidly secures the helix in place within a traveling wave tube, yet does not dielectrically load the helix excessively. Generally, the helix support has a ceramic block which is substantially the same length as the helix itself and which has an axial groove cut into one of its faces, the groove width being slightly less than the outer diameter of the helix to be supported. The helix then is laid along the groove in such a way that the helix touches the groove edges and partially extends into the groove. A ceramic rod having a diameter somewhat larger than the helix, e.g. a 30 mil rod would be used for a 20 mil helix, and a length substantially the same as the helix length lies on the helix and has a force applied to it in such a way that the helix is urged into the groove and against the groove edges which act like knife edges that tend to hold the helix stationary. To prevent the block itself from acting as a wave guide which rapidly propagates the wave on the helix to the tube output, the block is carbonized throughout except in the region near the axial groove.

A principal object of the invention is to provide a traveling wave tube helix support;

Another object of the invention is to provide a traveling wave tube helix support for extremely small diameter helices;

Another object of the invention is to provide a traveling wave tube helix support for small diameter helices which utilizes a porous ceramic supporting element.

The invention will be described with reference to the figures, wherein.

FIG. 4 is a cross sectional view of a supporting block which shows the manner in which the block is carbonized, FIG. 5 is a diagram useful in explaining the invention, FIG. 6 is an end view of apparatus embodying another form of the invention, FIG. 7 is an illustration showing how dielectric loading can be decreased further, and FIG. 8 is an illustration useful in showing how dielectric loading of the helix can be increased for greater bandwith handling capabilities.

Figure 1:
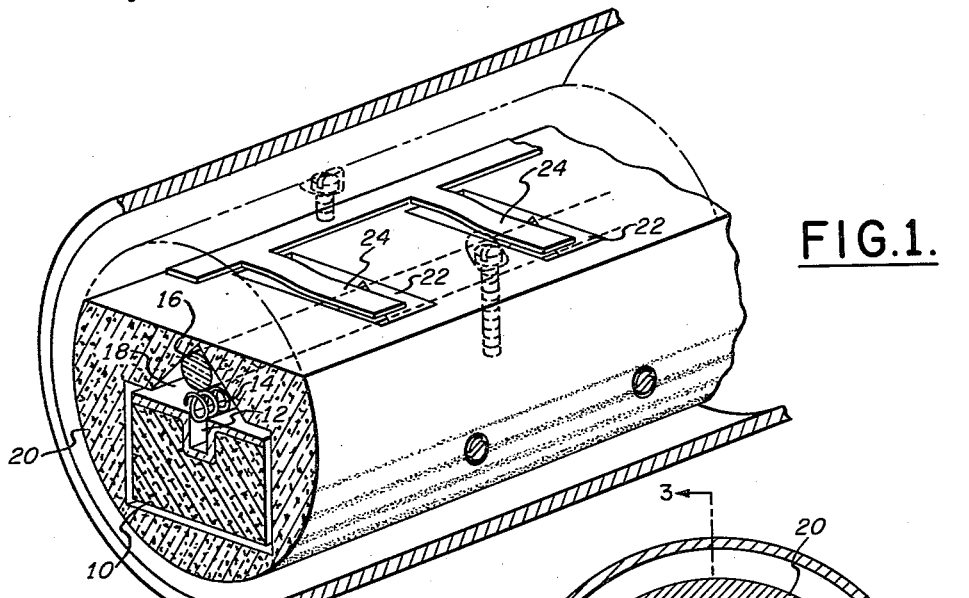
FIG. 1 is a perspective view of a helix support embodying the invention.
Figure 2:
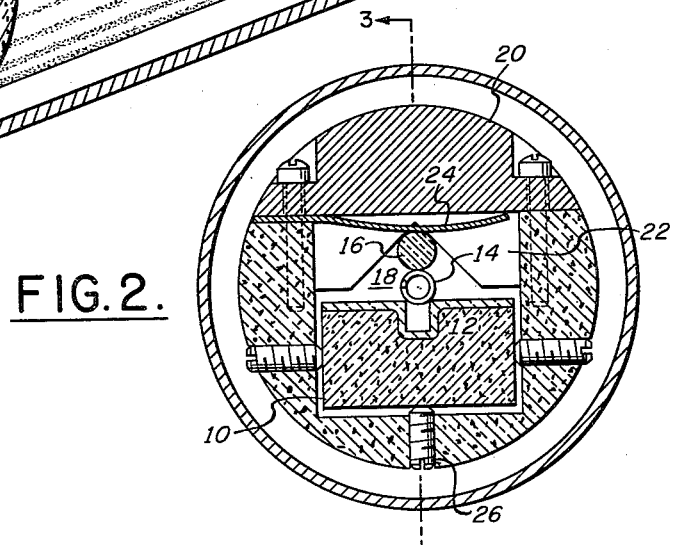
FIG. 2 is an end view of the apparatus shown in FIG. 1.
Figure 3:
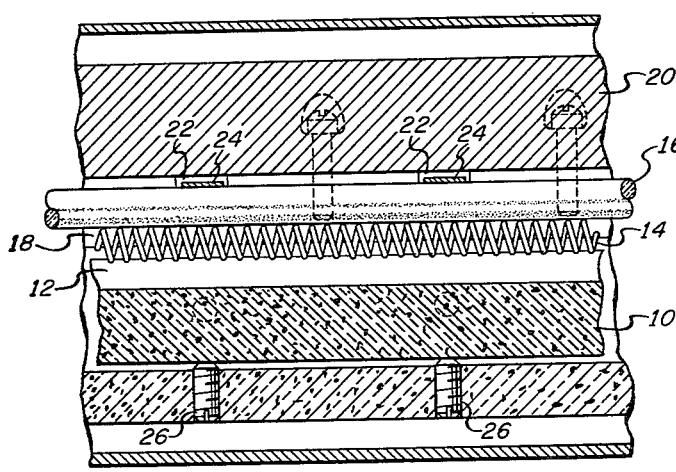
FIG. 3 is a view taken along line 3—3 of FIG. 2.

Referring to FIGS. 1–3, a helix support which is adapted to be encased within a traveling wave tube envelope is provided with a nonconductive support block 10 having a groove 12 cut along its length. The width of the groove 12 is preferably just slightly less than the outer diameter of the helix to be supported, but may be any width so long as it is not wider than the helix outer diameter. A helix 14 then is laid along the groove 12 as shown. A nonconductive rod, e.g. ceramic, either porous or nonporous, is placed above the helix 14 and held in place by the sides of a triangular axial cut 18 in a block 20. A portion of the rod 16 is carbonized in a conventional manner for the suppression of reflected waves from the output end of the tube. Lateral cuts 22, which extend deeper into the block 20 than the apex of the triangular cut 18, are intermittently spaced along the length of the block 20 and have flat springs 24 secured within them. The springs 24 apply a force against the rod 16 which urges the helix against the edges of the groove 12. Screws 26 force the blocks 10 and 20 together, thereby rigidly sandwiching the helix 14 between them.

The blocks 10 and 20 are both preferably carbonized porous ceramic, e.g. alumina, with the block 20 being carbonized throughout and the block 10 being carbonized as shown in the cross sectional view of FIG. 4. Porous ceramic, though brittle and difficult to use in conventional helix supports may be used for supporting the helix by apparatus embodying the present invention because of the rugged geometry of the blocks 10 and 20 and is preferred since it has a very low dielectric constant, i.e. it does not dielectrically load the helix very much. In addition, porous ceramic is readily carbonized, the need for which will be explained later. Carbonizing the block 20 throughout may be achieved simply by impregnating the ceramic with a glucose solution and heating it in an atmosphere of hydrogen. Carbonizing of the block 10 as shown in FIG. 4, however, is preferably achieved as follows: The block 10 is impregnated with a glucose solution, heated in air to about 350 degrees centigrade and then heated in an atmosphere of hydrogen gas to about 900 degrees centigrade to carbonize the block throughout. The block 10, then, is removed from the hydrogen atmosphere, masked on its faces $a$, $b$ and $c$, and reheated to about 900 degrees centigrade in an atmosphere of either hydrogen or forming gas, preferably forming gas, though, since forming gas is not combustible. The forming, or hydrogen, gas is removed then and replaced by oxygen (or air) which oxidizes the carbon on and immediately under the face $d$ as shown in FIG. 4. After being heated in the oxygen atmosphere for about 15 minutes, the block 10 is cooled. The above-described carbonizing technique is desirable because local stresses are never set up within the block 10 during the heating processes which tend to break the brittle porous ceramic.

Both blocks 10 and 20 are carbonized, i.e. impregnated with a lossy materinal, to prevent them from acting as wave guides and propagating fields which depart from the helix rapidly to the output end of the tube where they can react unfavorably with the amplified wave on the helix. If preferred, the block 20 could be machined out of metal with little effect on tube efficiency since a metallic block would serve as a reflective boundary which would reflect into the lossy block 10 waves which depart from the helix.

As is known, the gain of a traveling wave tube increases with increasing interaction between the beam passing through the helix and the wave propagating down the helix and can be maximum only when the dielectric constant of the medium surrounding the helix is low. It is known also that the gain vs. frequency curve for a dielectrically unloaded traveling wave tube is as shown in FIG. 5, curve A, and that dielectrics in the vicinity of the helix tend to increase the tube bandwith handling capabilities, by causing the phase velocity of the propagating helix wave to be substantially constant for a broad range of frequencies, thereby obviating the need for changing the D.C. potential of the interacting electron beam when the frequency of the applied signal is changed. Such action flattens the gain vs. frequency curve as shown in curve B of FIG. 5. Therefore, the amount of dielectric placed near the helix of a traveling wave tube is based upon both tube gain and bandwidth considerations. FIGS. 6 and 7 show apparatus embodying the invention which provide increased gain at the expense of bandwidth and FIG. 8 shows apparatus which provides increased bandwidth at the expense of tube gain.

Referring to FIG. 6, the helix support block 10 is identical to and functions exactly the same as the helix support block of FIGS. 1–3. A block 20′, functioning in a manner similar to the block 20, is secured to the block 10 by screws 26 and is provided with a two section axial cut 18′, one section of which is designated 18A. A rod 16′, preferably made of ceramic either porous or nonporous, is retained in the axial cut section 18a and is provided with a knife edge 28 which bears against the helix 14. Lateral cuts 22′ are provided along the length of the block 20′ and have flat springs 24 secured within them. The flat springs 24 force the rod 16 against the helix 14 in such a way that the knife edge 28 digs into and forces the helix against the edges of the groove 12, thereby rigidly holding the helix 14 stationary. The block 20′, like the block 20, may be made either of lossy material or a conductive metal.

In FIG. 7, the dielectric in the vicinity of the helix is decreased further by making the groove in the helix support block 10 trapezoidal in shape. In FIG. 8, the dielectric near the helix is increased simply by abrading the edges of the axial groove in the helix support block.

While the inventon has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A traveling wave tube helix assembly comprising a helix, a single electrically nonconductive support member substantially the same length as said helix and having a face wider than the helix diameter, said support member having a slot parallel to its longitudinal axis which is narrower than the outer diameter of said helix and said helix lying along the slot in such a way that it touches both edges of the slot, an electrically nonconductive rod in contiguous relationship with the helix, and means applying a force to said rod in such a way that the helix is pressed tightly against the slot edges by the rod, said support member being carbonized throughout except in close proximity to said slot.

2. The structure of claim 1 wherein the rod has a substantially circular cross-sectional area.

3. In a traveling wave tube, a helix assembly comprising a helix, a single nonconductive support member having a face wider than the helix diameter and a groove therein, the width of said groove being less than the outer diameter of the helix, said helix lying along and partially within said groove, and dielectric means urging said helix against the edges of the groove in such a way that substantially every turn of the helix makes intimate contact with the support and said dielectric means, said support member being carbonized throughout except in the vicinity of the groove.

4. A helix assembly for a traveling wave tube comprising a helix, a single support member having a face wider than the helix outer diameter and a rectangular groove along its length which has a width smaller than the helix outer diameter, the helix lying in the groove, a dielectric rod contiguous with said helix, and means applying a force to said rod in such a way that the rod presses the helix against the edges of the groove, said support member being made of a porous ceramic and being carbonized throughout except in the area in close proximity with the groove.

5. A traveling wave tube helix assembly comprising a helix, a single electrically nonconductive support member provided with a face wider than the helix outer diameter with a groove therein, the width of said groove being less than the outer diameter of said helix and extending the length of said support means, said support member being made of ceramic, carbonized throughout except in the region of said groove, and said helix lying along said groove and partially extending into it, and electrically nonconductive means urging said helix into said groove.

6. The structure of claim 5 wherein said ceramic is porous.

7. A travelling wave tube helix assembly comprising a helix, electrically nonconductive support means substantially the same length as said helix having a slot parallel to its longitudinal axis, said slot being narrower than the outer diameter of said helix and said helix lying along the slot in such a way that it touches both edges of the slot, an electrically nonconductive rod having a knife edge in contiguous relationship with the helix, and means applying a force to said rod in such a way that the helix is pressed tightly against the slot edges by the rod, said support means being carbonized throughout except in the region of said slot.

References Cited in the file of this patent

UNITED STATES PATENTS

| | | |
|---|---|---|
| 2,758,241 | Robinson | Aug. 7, 1956 |
| 2,794,143 | Warnecke et al. | May 28, 1957 |
| 2,806,170 | Bianculli | Sept. 10, 1957 |
| 2,922,067 | Van Dien | Jan. 19, 1960 |